United States Patent [19]
Grazine

[11] 3,877,859
[45] Apr. 15, 1975

[54] SAFETY PROTECTION STRUCTURE FOR MOLDING MACHINE

[75] Inventor: William Grazine, Piscataway, N.J.

[73] Assignee: Farrell Patent Company, Dunellen, N.J.

[22] Filed: Sept. 12, 1973

[21] Appl. No.: 396,519

[52] U.S. Cl. ............... 425/152; 74/616; 100/53; 192/133; 425/DIG. 211; 425/DIG. 231
[51] Int. Cl. ............................................. B29c 5/06
[58] Field of Search .. 425/151, 152, 153, DIG. 203, 425/DIG. 209, 242 B, 211, 231; 74/616; 192/133, 134; 100/53

[56] References Cited
UNITED STATES PATENTS

| | | | |
|---|---|---|---|
| 2,306,785 | 12/1942 | Lorentzen | 192/134 |
| 2,415,462 | 2/1947 | Cherry et al. | 425/153 |
| 2,934,129 | 4/1960 | Wilson et al. | 192/134 X |
| 3,016,669 | 1/1962 | Grosclaude | 425/DIG. 209 |
| 3,100,913 | 8/1963 | De Matteo | 425/DIG. 209 |
| 3,316,593 | 5/1967 | Neumann | 425/151 |
| 3,728,057 | 4/1973 | Grundmann et al. | 425/151 X |

*Primary Examiner*—J. M. Meister
*Assistant Examiner*—Horace M. Culver
*Attorney, Agent, or Firm*—Marvin Feldman; J. B. Felshin

[57] ABSTRACT

This molding machine has stations with molds that open and close, and has an indexing head that rotates periodically to shift core rods from one operating station to the next. A safety gate surrounds the space in which the mold and indexing head are located. The gate has to be raised to give an attendant access to the molds and indexing head, and when the gate is raised there are interferences that prevent the machine from operating, including latches that hold the molds open and limit switches that shut off power to the indexing head motor. There is novel power-operated mechanism for raising and lowering the gate so that all portions of the gate move up and down in synchronism.

20 Claims, 10 Drawing Figures

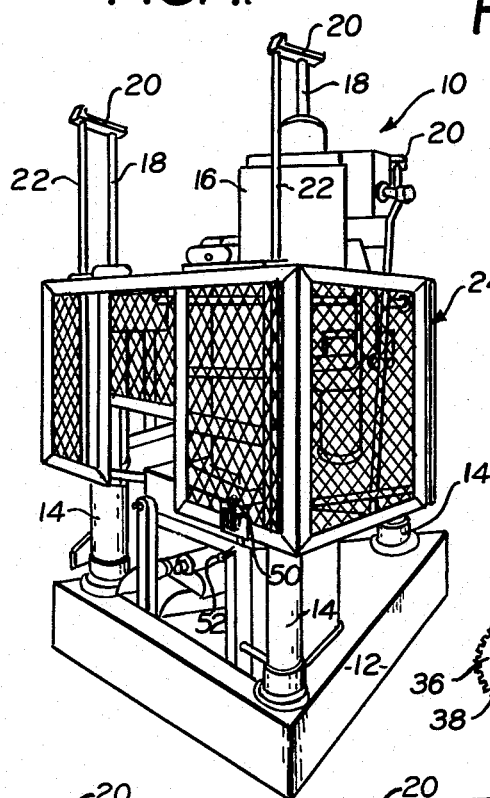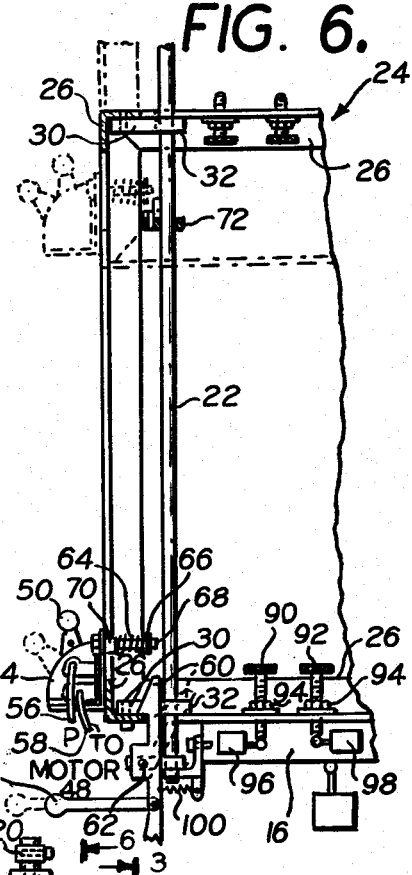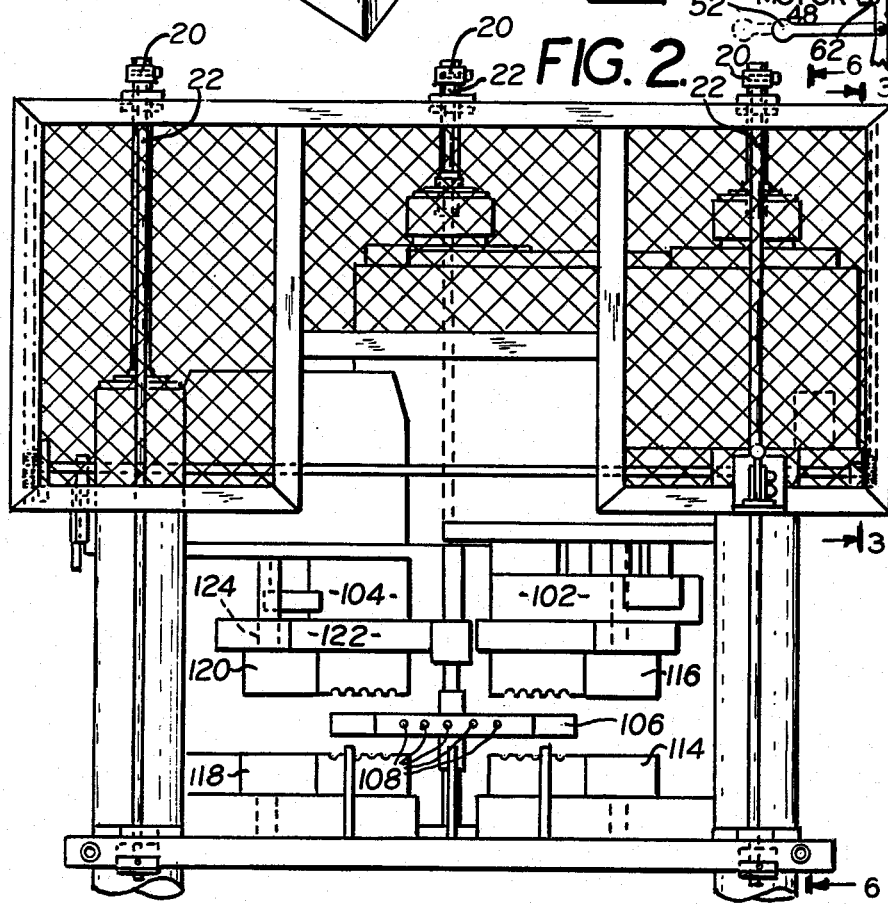

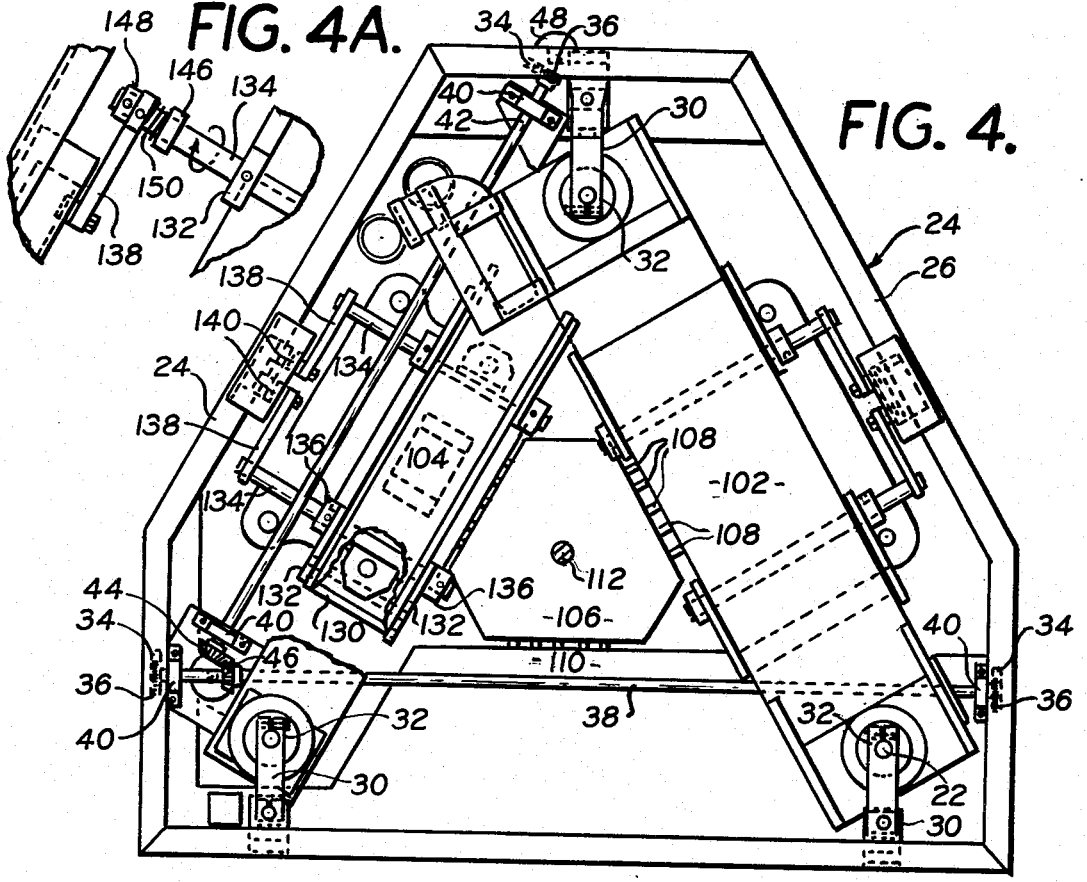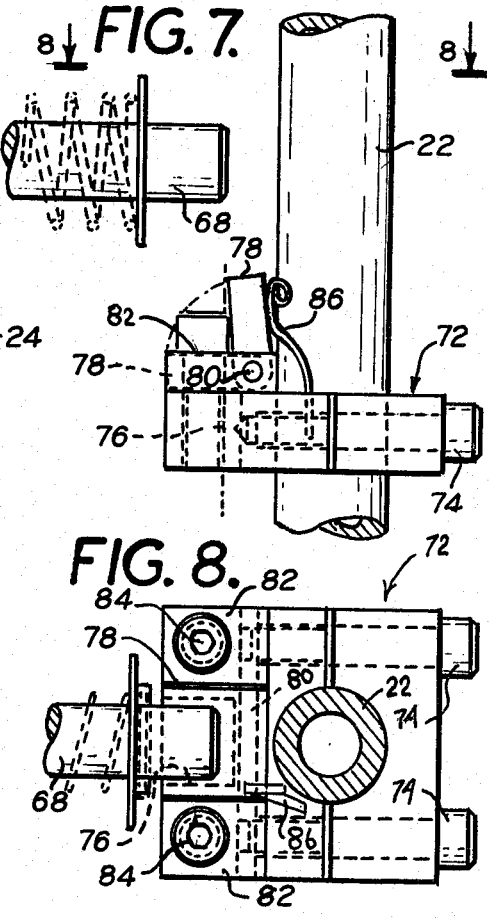

3,877,859

1

SAFETY PROTECTION STRUCTURE FOR MOLDING MACHINE

BACKGROUND AND SUMMARY OF THE INVENTION

Plastic molding machines, and particularly injection molding machines, have molds that open and close with great force applied to the molds. Core rods supports move automatically in timed relation with the mold operation and with high acceleration and deceleration. It is very dangerous for an attendant to have access to any of these moving parts of the machine when the machine is operating, or when there is any possibility that someone else might start the machine.

It is known to provide safety switches, but this invention provides greater safety by putting a cage or gate around the working parts so that an attendant does not have access to these parts unless the gate is raised to an open position. Because of the necessarily large size of the gate, it cannot be made rigidly stiff without making it have excessive weight. By making it light so that it has some flexibility, the difficulty arises that when the gate is pushed up by force applied at one portion of the gate, the eccentric application of force is likely to distort the gate so that it binds on some of its guides.

This invention provides a gate which surrounds the moving portions of the machine; and the gate is made of light but strong material with provision for causing different portions of the gate to move in unison when the gate is rising. This is done by having racks rigidly attached to portions of the gate at spaced locations; and then having pinions, which mesh with the racks, connected by shafting so that all of the pinions turn in unison and cause all of the racks to move up and down in synchronism with one another so that the gate cannot become distorted. It thus becomes practical to apply a motor to one portion of the gate and this effectively lifts the whole gate without any problems of binding on the guides.

Limit switches are associated with the gates so that the machine cannot operate except when the gate is in closed position. The machine also has latching mechanism that introduces interferences under end sections of the movable mold parts so that the molds cannot close when the gate is open. In the preferred construction, the interferences are released by cam mechanism on the gate in position to operate cam followers as the gate reaches its closed position.

Other features of the invention relate to control mechanism for causing the gate to move upward or downward in response to conveniently located manual control means.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a perspective view of a molding machine made in accordance with this invention;

FIG. 2 is a diagrammatic front view of the molding machine shown in FIG. 1;

FIG. 3 is a fragmentary, enlarged sectional view taken on the line 3—3 of FIG. 2;

2

FIG. 4 is a top plan view, partly broken away, of the molding machine shown in FIGS. 1 and 2;

FIG. 4A is a fragmentary view, on a larger scale, showing a modified connection for the crank arms of FIG. 4;

FIG. 5 is an enlarged view of one of the molds shown in FIG. 4 and a fragmentary view of a portion of the gate with cam mechanism for releasing the mold interferences when the gate is in its closed position;

FIG. 5A is a fragmentary view showing some parts in different positions than they are in FIG. 5;

FIG. 6 is a fragmentary view taken on the line 6—6 of FIG. 2;

FIG. 7 is a greatly enlarged detail view of a portion of the structure shown in FIG. 6; and FIG. 8 is a view taken on the line 8—8 of FIG. 7, but with the latch in its lowered position.

DESCRIPTION OF PREFERRED EMBODIMENT

FIG. 1 shows a molding machine 10 having a base 12 with three columns 14 extending upwardly from the base. These columns 14 support a fixed frame 16 of the molding machine.

Guide supports 18 extend upwardly from portions of the fixed frame 16; and these guide supports 18 have brackets 20 at their upper ends. There are three such guide supports 18 but only two of them are visible in FIG. 1. All of the brackets 20 can be seen in FIG. 1 and each of these brackets is connected with the top of gate guide 22.

A gate 24 slides up and down along the gate guides 22. In FIG. 1 the gate 24 is shown in its closed position where it bars access to the molds and indexing head which will be described later. When the gate is in raised position, its upper end is adjacent to the brackets 20. The gate has six sides but some of the sides are relatively short so that the overall cross section of the gate, in a horizontal plane, is generally triangular as will be evident from FIG. 4.

FIG. 4 shows the top edge of the gate 24 and this top edge is formed by the horizontal legs of angle sections connected together at the top of the gate. The entire frame of the gate 24 is made up of angle sections 26 similar to those which form the top edge and these angle sections can be connected together by welding or in any other suitable manner. Perforate wire screening 28 is attached to the frame of the gate 24 by welding, bolts or in any other suitable manner. In place of screening, solid panels can be used but the screening has the advantage of being lighter, providing visibility of the operating parts, and also providing ventilation.

There are bearing brackets 30 rigidly connected with some of the angle sections 26 at locations to support bearings 32 which slide up and down on the gate guides 22.

FIG. 3 shows a rack 34 connected between upper and lower angle sections 26 of the gate. This rack is an integral part of the gate and its meshes with a pinion 36 secured to a shaft 38.

There are three such racks 34 located at three different locations around the gate 24 and close to what might be considered vertices of the generally triangular outline of the gate 24 as shown in FIG. 4; and there is a pinion 36 in mesh with each of these racks 34. As shown in FIG. 4, the shaft 38 connects the pinions 36 on opposite sides of the gate 24 so that these pinions turn as a unit with one another. The shaft 38 is supported by bearing brackets 40 attached to a part of the fixed frame 16 of the molding machine.

The rack 34 at the top of the gate 24 in FIG. 4 has its pinion 36 secured to a shaft 42 and this shaft 42 rotates in bearings 40 attached to the fixed frame 16 of the molding machine. At the end of the shaft 42, remote from the pinion 36 there is a bevel gear 44 secured to the shaft 42 in position to mesh with a similar bevel gear 46 secured to the shaft 38. These bevel gears 44 and 46 are of the same pitch diameter so that the shafts 38 and 42 turn at the same rate. All of the pinions 36 are of the same size and mesh with similar racks 34 so that upward movement of one rack causes the pinions that mesh with the other racks to move those other racks upward in synchronism with the first rack. In this way the portions of the gate in the vicinity of the racks are moved upward and downward in synchronism with one another and this prevents the gate from becoming distorted if the force to raise it is applied to only one portion of the gate.

Thus the racks 34, pinions 36 and shafts 38 and 42, together with the connecting bevel gears 44 and 46 comprise motion-transmitting means for causing one portion of the gate 34 to move in synchronism with the other portions of the gate when the gate is being raised or lowered.

In the construction illustrated in FIG. 4 there is a cylinder and piston motor 48 having a piston rod connected with the lower part of the frame of the gate 24. This cylinder and piston motor 48 has a stroke as long as the travel of the gate 24 between raised and lowered positions. When the gate 24 is at its lowered position, the motor 48 is at one end of its stroke. Working fluid in the motor 48, preferably compressed air, pushes the piston of the motor 48 upward to raise the gate 24; and when working fluid, such as air, is exhausted from the lower end of the motor 48, the gate 24 descends by gravity with the motor 48 serving as a brake to limit the speed at which the gate 24 descends. The motor 48 is preferably located close to one of the racks 34 so that force from the motor is transmitted to the adjacent rack 34 without straining or distorting the frame of the gate; and this force of the motor is transmitted through the rack 34 and pinion 36 to the other racks 34 which have been explained and which cause the other portions of the gate to receive the motor thrust through the motion-transmitting connections which include the shafts 38 and 42, as previously explained.

The manual controls for the raising and lowering of the gate 24 include a handle 50 which is carried by the gate 24 and another handle 52 which is connected with a latch on a fixed part of the frame of the machine as will be described more fully in connection with FIG. 6. The handle 50 controls the working fluid to the motor that raises and lowers the gate and the handle 52 is for the purpose of releasing a latch which holds the gate in its closed position.

FIG. 6 shows the handle 50 connected with a valve 54 mounted on the front of the gate 24. The valve 54 has two flexible hoses 56 and 58 connected with it. The hose 50 leads to a source of working fluid pressure, such as compressed air; and the hose 58 leads to the lower end of the cylinder 48. In the preferred operation of the gate, the cylinder 48 is maintained under pressure to raise the gate whenever the machine is in operation; but the gate is held against rising movement by a latch 60. This latch 60 is connected with the fixed frame of the molding machine by a pivot 62 and the latch can be moved in a direction to release it from its engagement with the angle section 26 of the gate 24 by pulling the handle 52 from its full line position to its dotted line position. This movement of the handle 52 moves the latch 60 into the dotted line position shown in FIG. 6. This releases the latch and permits the motor 48 to push the gate 54 to its uppermost position.

When the handle 50 of the valve 54 is located in the full line position shown, to which it is urged by a spring 64, working fluid flows from the hose 56 through the valve 54 and hose 58 to the motor 48 so as to push the gate 54 to the top limit of its travel.

The spring 64 pushes against a collar 66 on a plunger 68 which is attached to the handle 50 and which slides axially in a bearing 70 attached to a part of the gate 24.

There is a collar 72 secured to the gate guide 22 by clamping screws 74, best shown in FIG. 7. There is a slot 76 extending upward through the left hand side of the collar 72 and this slot is best shown in FIG. 8. The plunger 68 passes through this slot 76 as the gate rises. A latch 78 extends across the top of the slot 76. This latch 78 swings about a pivot 80, the opposite ends of this pivot shaft 80 extending to bearing blocks 82 attached to the top of the collar 72 by bolts 84.

The latch 78 normally rests in the position indicated in dotted lines in FIG. 7 where the latch is resting on the top of the collar 76 on opposite sides of the upper end of the slot 76. As the gate 24 rises, the plunger 68 passes upward through the slot 76 and displaces the latch 78 into the full line position shown in FIG. 7. This permits the plunger 68 to pass upwardly beyond the collar 72 and thus prevents the collar from stopping upward movement of the gate 24. A leaf spring 86 is attached to the collar 72 and this spring pushes the latch 78 counterclockwise, after the plunger 68 has passed so that the latch 78 is at a sufficient slope to drop by gravity into contact with the upper surface of the collar 72.

If the gate 24 starts to descend, because of reduced working fluid pressure in the motor 48, the plunger 68 comes in contact with the top of the latch 78 and prevents any further downward movement of the gate. When an attendant wishes to have the gate descend, he reaches up to the handle 52 which has risen with the gate 24, and pulls the handle 52 from its solid line position to its dotted line position in FIG. 6. This causes the plunger 68 to be pulled to the left in FIG. 6, against the pressure of the spring 64, and moves the end of the plunger 68 beyond the limit of the collar 62 so that the plunger can pass the collar and the latch on the collar. This same movement of the handle 50 to the left in FIG. 6 causes the valve 54 to move into a position in which working fluid from the motor 48 can flow through the hose 58, valve 54, and through an exhaust port of the valve 54 so that working fluid escapes from the lower end of the motor 40 and the pressure in the motor 40 is relieved as the gate 24 moves downward by gravity. Exhaust of working fluid from the motor 48 controls the rate at which the gate 24 descends to its lowered position.

There are actuators comprising screws 90 and 92 threaded through bosses on the section 26 of the gate 24 at the lower end of the gate as shown in FIG. 6. These screws 92 have lock nuts 94 by which they can be held in any adjusted position. The lower ends of the screws 90 and 92 contact with limit switches 96 and 98 connected to the fixed frame 16 of the molding machine. The screws 90 and 92 are adjusted so that they operate the switches 96 and 98, respectively, to restore power to the electrical operating units of the molding machine so that the molding machine can again be operated since the safety gate 24 has returned to its lowered position. Whenever the gate 24 begins to rise, the screws 90 and 92 move out of contact with the limit switches 96 and 98, respectively, and this causes the limit switches to operate automatically to shut off all electric power used to operate the molding machine.

As the gate 24 descends and approaches its lower limit of travel, the angle section 26 pushes the latch 60 in a clockwise direction with a cam action as the section 26 contacts with the sloping left hand face of the latch 60. As soon as the section 26 has moved beyond the sloping cam surface of the latch 60, a spring 100 snaps the latch 60 into its full line position and the gate is held down. Since the valve 54 is operated by the spring 64, it is necessary that the attendant hold the valve handle 50 in the dotted line position until the gate 24 has descended far enough to be engaged by the latch 60.

Referring to FIG. 4, there is enclosed within the gate 24 an injection station 102 and a blowing station 104. An indexing head 106 provides a core rod support for core rods 108 which project from the core rod support 106 into molds located at the stations 102 and 104. The region indicated by the reference character 110 is the region for the stripping of molded articles from the core rods. This is the stripper station but no details of the stripper station are shown in FIG. 4 since it is conventional. It is sufficient to understand that when the molds are open at the stations 102 and 104, the indexing head 106 rotates 120° to carry the core rods at one station to the next station, the rotation of the indexing head 106 being counterclockwise in FIG. 4.

The indexing head rotates about a center shaft 112 and is operated by conventional control mechanism which also coordinates the opening and closing of the molds at the stations 102 and 104. FIG. 2 shows diagrammatically the indexing head 106 with core rods 108 projecting from the indexing head. At the injection station 102 there is a mold having a lower part 114 which is in a fixed position, and a movable part 116 which moves toward and from the fixed part 114.

Similarly the blowing station 104 has a mold with a fixed part 118 secured to the frame of the molding machine, and a movable part 120 that moves toward and from the fixed part to close and open the mold.

The upper mold parts 116 and 120 are moved by hydraulic rams in conventional molding machines or by link mechanisms and the operating mechanisms are not illustrated in the drawing since they are conventional and no illustration of them is necessary for a complete understanding of this invention.

The mold part 120 is attached to a movable platen 122 which is moved up and down along dowel guides 124. This is also conventional and the novelty in the construction of this invention is shown in FIG. 5. The movable mold part 120 and the movable platen 122, to which the mold part 120 is secured, are shown in full lines in FIG. 5 in the position occupied when the mold is open. These parts 120 and 122 are shown in dotted lines in the positions occupied when the mold is closed.

The movable platen 122 is guided by dowels 126 which extend upwardly from end lugs 128 of the movable platen 122 into guides in the fixed frame 16. There are cross bars 130 which extend across the underside of the lugs 128, when the mold is in open position and these cross bars 130 constitute interferences which make it impossible for the movable platen 122 to move downwardly to close the mold.

Each of the cross bars 130 has an arm 132 connected to it at each end. One of these cross bars 130 and its connecting arms 132 are shown in plan view in FIG. 4.

Each of the arms 132 extends upward to a shaft 134 and these shafts are rotatable in bearings 136 secured to the fixed frame 16.

Each of the shafts 134 extends outwardly and has a crank 138 fastened to the end of the shaft 134 at a location adjacent to the gate 24. Each of the cranks 138 carries a cam follower 140 at its end remote from the shaft 134.

There is a cam plate 142 attached to the upper end of the gate 24 in position to push the cam followers 140 downwardly so as to rock the shafts 134 in directions that swing the arms 132 into the dotted line positions shown in FIG. 5. This moves the cross bars 130 out from under the end of the lugs 128 so that the movable platen 122 can move downwardly to close the mold.

As the gate 24 moves from its closed position toward open position, the downward pressure of the cam plate 142 is removed from the cam followers 140 and the arms 132 and cross bars 130 move back toward vertical position under the influence of gravity, the arms 132 and the cross bars 130 being substantially heavier than the cranks 138.

If the mold 120 is closed and the movable platen 122 is in the dotted line position shown in FIG. 5 then the cross bars 130 rest against the sides of the dowels 126 as shown for one side in FIG. 5A which has the arm 132 and the dowel 126 broken away.

Under such circumstances, with the gate raised, it may be necessary to open the mold in order to work on it and the machine can be manipulated manually to cause the ram that closes the mold to move the mold into open position. As the movable platen 122 rises, there is a cam surface 146 on each of the end lugs 128 which pushes the cross bars outwardly so that the movable platen 122 can pass them and as soon as the movable platen 122 rises far enough, the arms 132 and the cross bars 130 fall into their vertical positions under the movable platen 122 so that there is no danger of having the mold close while an attendant is working on it.

In the preferred construction, some elasticity is introduced between the cranks 138 and the shafts 134. No attempt is made to show this in FIGS. 4 and 5 because of the small scale of these figures. FIG. 4A is a greatly enlarged detail view which shows an elastic connection between one of the shafts 134 and its connected crank 138. The crank 138 is loose on the shaft 134 so that the shaft and crank can rotate with respect to one another. There is a fixed collar 146 on the shaft 134 and there is another fixed collar 148 located near the end of the shaft 134. The crank 138 is held against the collar 148 by a torsion spring 150. This torsion spring fits freely around the shaft 138 and has its opposite ends inserted into the collar 146 and the crank 138.

With no torsion on the spring 140, the crank 138 extends at the desired phase angle to the shaft 134 which is necessary to obtain the operation of the arms 132 in the manner already explained.

The spring 150 does provide elasticity between the shafts 134 and the crank 138 so that the crank and shaft can change their angular relation with respect to one another as may be necessary temporarily during operation of the mechanism. The torsion spring 150 also eliminates shock when the cam plate contacts with the cam followers, and it makes unnecessary the close manufacture tolerances which would otherwise be necessary in the construction of the apparatus.

It will be understood that both of the shafts 134 preferably have the elastic connection with their cranks as shown in FIG. 4A. The movable mold part and the movable platen to which it is connected at the injection station 102 (FIG. 4) has the same interference mechanism as described in FIG. 5 and for the blow molding station 105. Parts at injection molding station 102, which correspond to the parts already described at the blow molding station 104, are indicated by the same reference characters in FIG. 4 with a prime appended.

The preferred embodiment of the invention has been illustrated and described, but changes and modifications can be made and some features can be used in different combinations without departing from the invention as defined in the claims.

What is claimed is:

1. A molding machine, for making plastic articles or the like, including in combination core rod supporting means, a core rod coating station, a blowing station, a stripper station, apparatus for moving the supporting means to shift the core rods from one station to another, the mold at one of the stations including a part that moves toward and from another part to open and close the mold, mechanism for moving the movable part, a safety gate that moves into a closed position for barring access, by an operator, to the mold, guides at different sides of the gate and along which the gate is movable into an open position where it leaves the mold accessible to an operator, mechanism for moving one side of the gate along its guide, motion-transmitting means extending from one side of the gate to the other for moving said other side along its guide in synchronism with the movement of the gate along the first guide, and an interference that prevents operation of the mechanism for opening and closing the mold when the gate is in open position.

2. The molding machine described in claim 1 characterized by the guides comprising vertical elements along which the gate slides, said elements extending for a distance sufficient to move the gate to a height that leaves the mold accessible to an operator.

3. The molding machine described in claim 2 characterized by the guides extending upward above a zone of access to the mold for a distance equal to the height of the gate.

4. The molding machine described in claim 1 characterized by the gate having a portion that extends across the front of the machine, another portion that extends across a side of the machine, guides at both sides of each portion of the gate, and motion-transmitting means for each portion for moving one side of each portion in synchronism with the other side of that portion of the gate.

5. The molding machine described in claim 2 characterized by the motion-transmitting means comprising a rack secured to one side of the gate and extending in the direction of movement of the gate, a pinion that meshes with the rack, a shaft to which the pinion is secured, a bearing, at a relatively fixed location on the machine, in which the shaft is turned by the pinion when the rack moves up and down with the gate, the shaft extending to a location adjacent to the other side of the gate, a bearing in which the shaft turns at said other side, a second pinion secured to the shaft, a second rack secured to said other side of the gate in position to mesh with the second pinion whereby rotation of the first pinion by the first rack causes the second pinion to move the second rack in synchronism with the first rack.

6. The molding machine described in claim 5 characterized by the gate having a second portion that extends across a different side of the machine, rack and pinion mechanism for moving the second portion of the gate including a second shaft extending from one side to the other of the second portion of the gate, and means for raising both portions of the gate in synchronism.

7. The molding machine described in claim 6 characterized by the means for raising both portions of the gate in synchronism including gearing connecting the first shaft with the second shaft for rotation in unison therewith.

8. The molding machine described in claim 1 characterized by the core rod supporting means being an indexing head of generally triangular cross section and having three faces at 120° angular spacing and from each of which core rods extend, an injection mold at the core rod coating station including a mold part that moves toward and from another to close and open the injection mold, a blowing mold at said blowing station, the gate extending around the outside of the portion of the machine that includes the indexing head and molds so as to block access to the indexing head and movable mold parts when the gate is closed, the gate including a frame of generally triangular cross section with guides adjacent to each of the vertices of the cross section of the frame, the motion-transmitting means for raising the gate extending to the region of each of the vertices of the gate frame.

9. The molding machine described in claim 1 characterized by the mold including an interference movable into a position where it prevents the mold from closing, and control means actuated by movement of the gate to the closed position for moving the interference into inoperative position so that the mold can close.

10. The molding machine described in claim 9 characterized by the interference including a hook that swings angularly into a lowered position in which a portion of the hook extends under the movable part of the mold to block movement of the mold to a closed position, and cam means including a cam and a cam follower for swinging the hook out of its lowered position, one of the cam means being connected with the hook and the other of the cam means being secured to and movable with the gate.

11. The molding machine described in claim 10 characterized by a ram that moves the movable part of the mold toward and from the other part to close and open the mold, a fixed frame of the machine, a bearing on the fixed frame in which the ram moves, other bearings carried by the fixed frame and extending axially generally parallel to opposite ends of the movable part of the mold, a hook that hangs from each of said other bearings with the lower part of the hook movable into an interference position under an adjacent end of the movable part of the mold, arms extending from the respective hooks, cam followers on the arms, and cams on the gate in position to operate the cam followers to move the hooks out of said interference positions when the gate reaches its closed position.

12. The molding machine described in claim 1 characterized by motor means for moving the gate in one direction, a lock holding the gate against movement by said motor means, means for releasing the lock, control means for reversing the movement of the motor means to return the gate to its original position.

13. The molding machine described in claim 12 characterized by the motor means being a cylinder and piston air motor containing compressed air that urges the motor to raise the gate whenever the lock is released, and a valve carried by the gate and connected with the motor means by flexible hoses, the valve being movable into a position that releases air from the motor so that the gate can descend by gravity and force the air out of the motor as the motor returns to its original position.

14. The molding machine described in claim 1 characterized by interferences operated by movement of the gate to prevent closing of the mold and operation of the core rod support when the gate is in raised position.

15. The molding machine described in claim 14 characterized by means at both ends of the stroke of the gate for conditioning the mold operating mechanism and the apparatus for moving the core rod supporting means for operation and for preventing such operation depending upon the position of the gate along its stroke.

16. A molding machine for making plastic articles or the like including a mold having a first part support from the machine, a second mold part movable along a predetermined path toward and from the first part to close and open the mold, a motor-operated ram for moving the second mold part toward and from the first part, a fixed frame of the machine with a bearing in which the ram moves to actuate the second mold part of the mold toward and from the first part, an arm extending from the fixed frame, bearing means on the fixed frame and supporting the arm and about which the arm is angularly movable, the arm having an interference extending from it across a surface of the second mold part that faces the first part of the mold and in the path of movement of the second part of the mold when the mold is moving toward closed position, the arm and interference being of sufficient strength to stop the movement of the ram, a movable safety gate associated with said molding machine, and means mounted on said safety gate for moving the arm and interference out of interfering position when the mold is to be closed.

17. The molding machine described in claim 16 characterized by a plurality of molds at different positions on the molding machine, each with a ram and a bearing, on the fixed frame, with which the ram moves, other bearings supported by the fixed frame, arms extending down from said other bearings at each end of the movable parts of the different molds, and each of the arms having an interference that extends under one end of one of the movable parts of one of the molds.

18. The molding machine described in claim 17 characterized by the arms being located in positions that cause them to swing by gravity into interfering positions when the second mold part moves past the interference on said arm that extends under the movable part when the mold is open, said interferences being shaped for contact with the ends of the movable parts of the molds along surfaces that exert a cam action to swing the arms outward from the ends of the molds as the molds open.

19. A molding machine, for making plastic articles or the like, including in combination core rod supporting means and a plurality of operational stations, a mold at one of the stations including a part that moves toward and from another part to open and close the mold, mechanism for moving the movable part, a safety gate that moves into a closed position for barring access, by an operator, to the mold, guides at different sides of the gate and along which the gate is movable into an open position where it leaves the mold accessible to an operator, an air operated cylinder and piston motor that raises the gate to its open position, valve means for supplying energy to the motor, said valve means including a manually operated handle attached to the lower part of the gate and in position to be manually actuated when the gate is either in open or closed position, and means preventing operation of the mold when the gate is out of its closed position, characterized by the cylinder and piston motor being air operated and having air pressure on the piston when the gate is down, a latch that holds the gate down against the pressure of the air that operates the motor, the valve means being operable into position to release air pressure in the motor when the gate is open and to be closed, the valve means being attached to the gate for movement up and down as a unit with the gate, a handle that operates the valve means and that moves up and down as a unit with the valve means, a latch on the gate near the valve means and in position to engage a stop on one of the gate guides, the handle that operates the valve means being connected with the latch and connected so as to release the latch when moved into the position that operates the valve means to lower the gate into closed position, a different handle for releasing the latch that holds the gate in closed position, and limit switches operated by the closing of the gate for making the mold operating mechanism of the machine operable.

20. The molding machine described in claim 19, characterized by limit switches at both the upper and lower ends of the travel of the gate, and adjustable operating mechanism on the gate for operating the limit switches.

* * * * *